US007504607B2

(12) United States Patent
Barragan Perez et al.

(10) Patent No.: US 7,504,607 B2
(45) Date of Patent: Mar. 17, 2009

(54) METHOD FOR OPERATING A FREQUENCY CONVERTER CIRCUIT

(75) Inventors: Luis Angel Barragan Perez, Zaragoza (ES); Jose Miguel Burdio Pinilla, Zaragoza (ES); Pablo Jesus Hernandez Blasco, Zaragoza (ES); Sergio Llorente Gil, Zaragoza (ES); Alfonso Lorente Perez, Zaragoza (ES); Fernando Monterde Aznar, Zaragoza (ES)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 243 days.

(21) Appl. No.: 10/578,107

(22) PCT Filed: Nov. 2, 2004

(86) PCT No.: PCT/EP2004/052755

§ 371 (c)(1),
(2), (4) Date: Jul. 17, 2006

(87) PCT Pub. No.: WO2005/043737

PCT Pub. Date: May 12, 2005

(65) Prior Publication Data

US 2007/0135037 A1  Jun. 14, 2007

(30) Foreign Application Priority Data

Nov. 3, 2003 (ES) ................................ 200302616

(51) Int. Cl.
*H05B 6/06* (2006.01)

(52) U.S. Cl. ....................................... 219/624; 219/625
(58) Field of Classification Search .................. 219/624
See application file for complete search history.

(56) References Cited

U.S. PATENT DOCUMENTS

| 5,932,934 A | * | 8/1999 | Hofstetter et al. ............. 307/26 |
| 6,018,154 A | | 1/2000 | Izaki et al. |
| 6,528,770 B1 | | 3/2003 | Akel et al. |

FOREIGN PATENT DOCUMENTS

| DE | 196 54 268 A1 | 7/1997 |
| EP | 0 888 033 | 12/1998 |
| EP | 0 926 926 A1 | 6/1999 |
| JP | 8-213163 | 8/1996 |

* cited by examiner

*Primary Examiner*—Joseph Chang
(74) *Attorney, Agent, or Firm*—Laurence A. Greenberg; Werner H. Stemer; Ralph E. Locher

(57) ABSTRACT

A frequency converter circuit has at least two outputs that are respectively connected to a load, in particular an induction coil. A first output is operated at a first switching frequency and a second output is simultaneously operated at a second switching frequency that is different from the first, in such a way that noise having a frequency generated by the superposition of the first switching frequency and the second switching frequency is produced. The frequency converter circuit is operated in such a way that the frequency of the noise is lower than a first cutoff frequency and/or is higher than a second cutoff frequency.

8 Claims, 3 Drawing Sheets

METHOD FOR OPERATING A FREQUENCY CONVERTER CIRCUIT

BACKGROUND OF THE INVENTION

Field of the Invention

The present invention relates to a method for operating a frequency converter circuit comprising at least two outputs that are respectively connected to a load, especially an induction coil, wherein a first output is operated at a first switching frequency and a second output is simultaneously operated at a second switching frequency that is different from the first in such a way that noise having a frequency generated by the superposition of the first switching frequency and the second switching frequency is produced.

Modern induction cooking surfaces are usually equipped with two or four induction cooking zones. The induction cooking zones have induction coils which are supplied with high-frequency operating currents by means of converter circuits. It is known to operate two induction coils jointly by means of one converter circuit with two outputs, each of the outputs being connected to an induction coil. Various procedures have been proposed for avoiding or reducing noise when both outputs are operated simultaneously.

Known from DE 196 54 268 C2 is a method for operating the converter circuit where both outputs of the converter circuit are operated in time multiplex so that no noise can occur. The disadvantage of this method is that elaborate triggering and over-dimensioning of the power electronics is required.

If the outputs are not operated in time multiplex and the two induction coils are supplied simultaneously with operating currents at different frequency, noise is produced. It is known to reduce this noise by means of choking coils connected in series to the induction coil. The disadvantage of this method is that the method is not always stable. In addition, the noise can only be damped and the choking coils are required as additional components, making the converter circuit more elaborate.

SUMMARY OF THE INVENTION

It is the object of the invention to provide an improved and cost-effective method for operating a converter circuit comprising at least two outputs, especially for an induction cooking surface.

This object is solved by a method for operating a converter circuit having the features of claim 1.

In a converter circuit comprising at least two outputs that are respectively connected to a load, especially an induction coil, a first output is operated at a first switching frequency and a second output is simultaneously operated at a second switching frequency that is different from the first. In this way noise having a frequency generated by the superposition of the first switching frequency and the second switching frequency is produced. The converter circuit is operated in such a way that the frequency of the noise is lower than a first cut-off frequency and/or higher than a second cut-off frequency. This procedure has the advantage that noise can be produced at a frequency that lies outside the human audible range by appropriately selecting the first cut-off frequency and the second cut-off frequency. Furthermore, the induction coils can be operated at frequencies at which a high efficiency can be achieved. In addition, additional components such as choking coils for reducing the noise can be dispensed with.

According to a preferred embodiment, it is provided that the first switching frequency and/or the second switching frequency are operated in such a way that the frequency of the noise is lower than the first cut-off frequency and/or higher than the second cut-off frequency. The switching frequencies of the outputs can be simply adapted by means of intelligent power switches.

Advantageously an electrical power of at least one of the outputs is regulated by means of a relative switch-on time and/or the switching frequency. Thus, the converter circuit can be operated with the induction coils in such a way that a high efficiency is achieved.

According to a preferred embodiment, it is provided that the first cut-off frequency and/or the second cut-off frequency are determined depending on a level of the noise. In this way, the cut-off frequencies can be adapted to the human audibility threshold so that the noise cannot be perceived.

In particular, the first cut-off frequency and/or the second cut-off frequency are determined depending on a total electrical power of the outputs. The level of the noise depends on the total electrical power of the outputs and the total electrical power can easily be determined. In this way, the cut-off frequencies can be adapted especially easily to the human audibility threshold.

According to a preferred embodiment, it is provided that the first cut-off frequency is 2 kilohertz and/or the second cut-off frequency is 14 kilohertz. For these cut-off frequencies the human audibility threshold is very high so that the level of the noise does not reach the human audibility threshold or only insignificantly exceeds it.

In particular, the invention relates to an induction cooking device such as, for example, an induction cooking surface or a cooker with an induction heating element.

The invention and its further developments are explained in detail hereinafter with reference to drawings:

In the figures

DESCRIPTION OF THE PREFERRED EMBODIMENTS

Figure 1A:
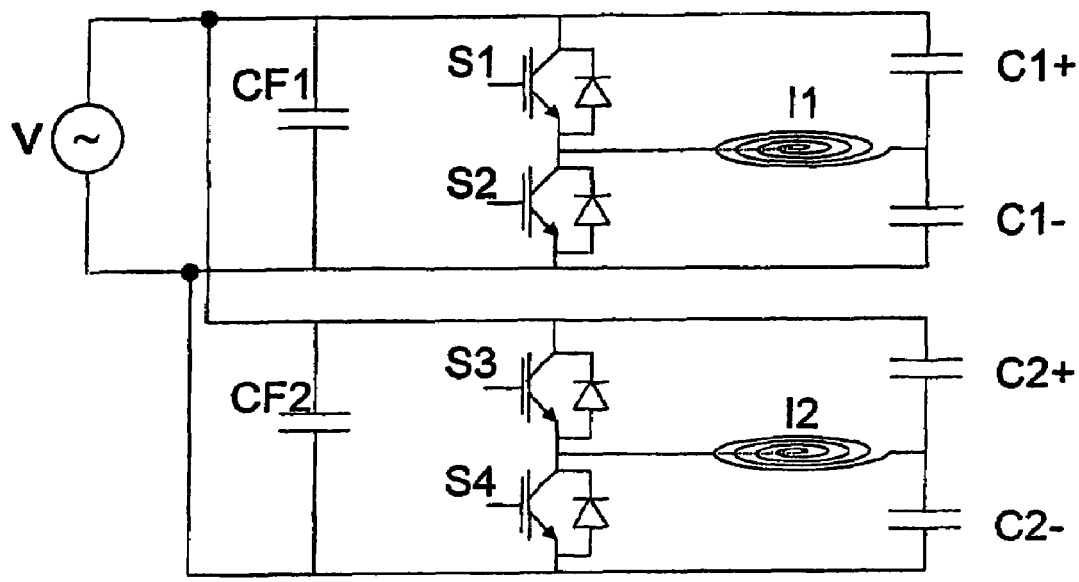
FIG. 1a is a first embodiment of a converter circuit.
Figure 1B:
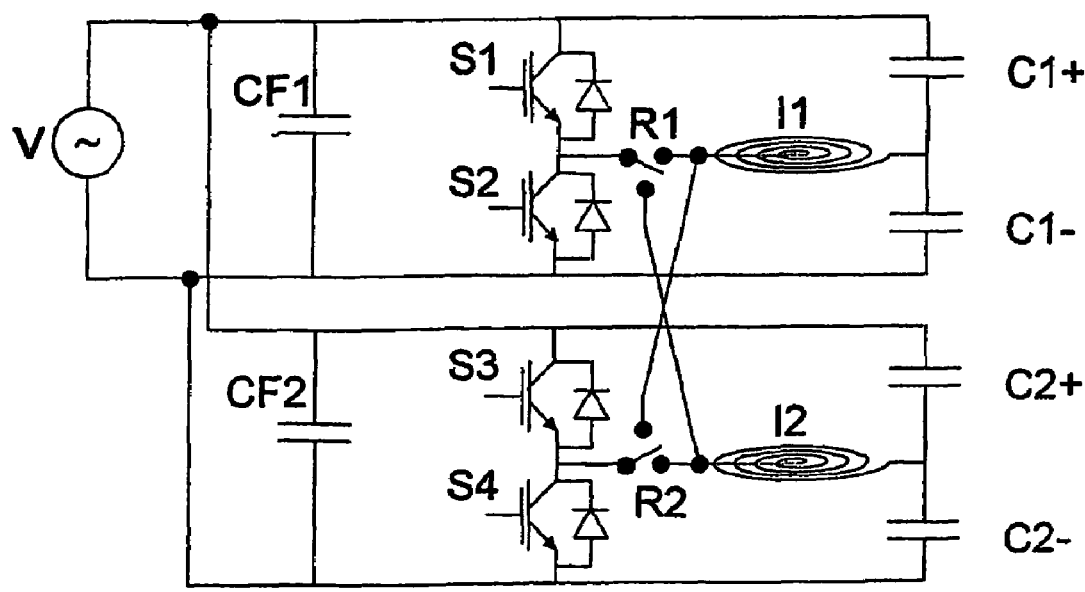
FIG. 1b is a second embodiment of a converter circuit.

FIGS. 1a and 1b are schematic diagrams showing two different embodiments of a converter circuit comprising two outputs or induction coils. Here V designates a voltage source, I1 is a first and I2 is a second induction coil, S1, S2, S3 and S4 are high-frequency switches, CF1 and CF2 are capacitive input filters and C1+, C1−, C2+ and C2− are capacitors. The second embodiment (FIG. 1b) differs from the first embodiment (FIG. 1a) in that two changeover switches R1, R2 are provided for reconfiguring the topology for the case when both induction coils I1, I2 are not switched on or both outputs are not active.

Figure 2:
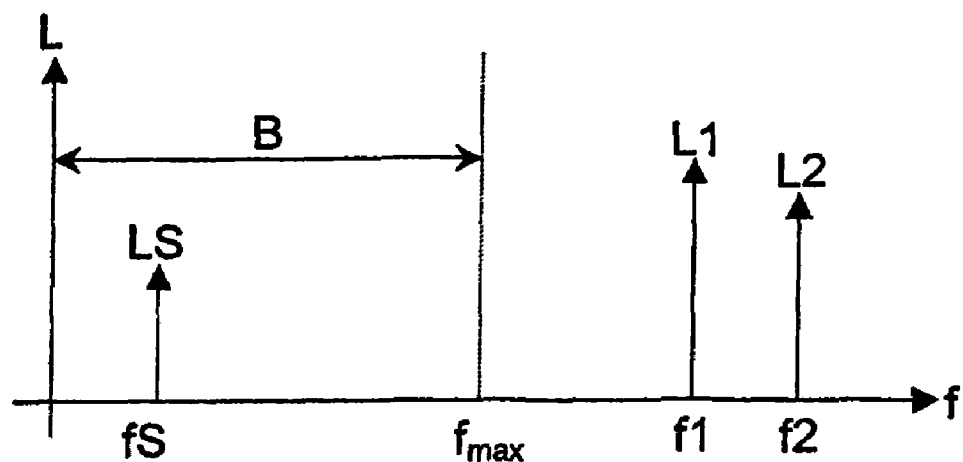
FIG. 2 is a schematic diagram of possible noise frequencies during operation of the converter circuits according to FIG. 1.

FIG. 2 shows a schematic diagram of possible frequencies of the noise during operation of the converter circuits according to FIG. 1a or 1b. The first induction coil I1 is operated at a first switching frequency f1 and the second induction coil I2 is operated at a second switching frequency f2 which is higher than the first switching frequency f1. Both switching frequencies f1, f2 lie above a maximum frequency $f_{max}$ which can be perceived by human hearing. In this way, noise produced at the switching frequencies f1 and f2 cannot be heard by humans. As a result of a superposition of the two switching frequencies f1, f2, further noise is produced, for example, at a frequency fS which corresponds to a difference comprising the second switching frequency f2 minus the first switching frequency f1. This frequency fS can lie in a frequency band B which indicates the frequencies perceptible by humans. The noise can have different levels L1, L2, LS at different frequencies f1, f2, fS which is indicated by arrows of different length at the frequencies f1, f2 and fS in FIG. 2.

Figure 3:
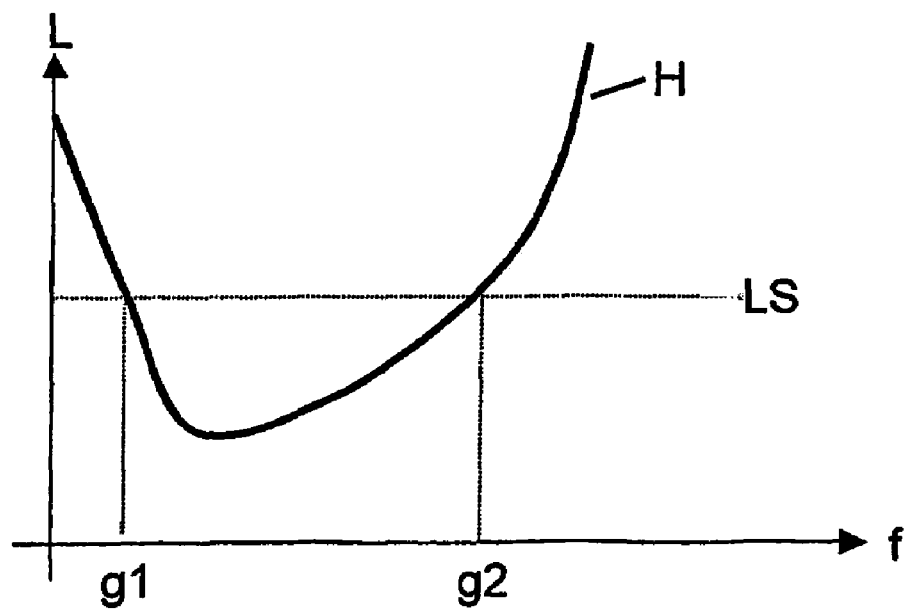
FIG. 3 is a schematic profile of the human audibility threshold.

FIG. 3 shows a schematic profile of the human audibility threshold H. Depending on the frequency f, a different minimum noise level L can be perceived by the human hearing which is indicated by the profile of the audibility threshold H in FIG. 3. A first cut-off frequency g1 and a second cut-off frequency g2 are determined using the level LS of the noise and its points of intersection with the profile of the audibility threshold H, the first cut-off frequency g1 being lower than the second cut-off frequency g2. The converter circuits according to FIGS. 1a and 1b are operated according to the invention so that the frequency fS of the noise is lower than the first cut-off frequency g1 or higher than the second cut-off frequency g2. In this way the noise is outside the human hearing range and thus cannot be perceived. The level LS of the predicted noise can, for example, be estimated using the switching frequencies f1, f2 and the electrical powers P1 and P2 supplied to the induction coils. Alternatively, experimental cut-off frequencies g1, g2 can be defined, for example, the first cut-off frequency g1 at 2 kilohertz and the second cut-off frequency g2 at 14 kilohertz.

Figure 4:
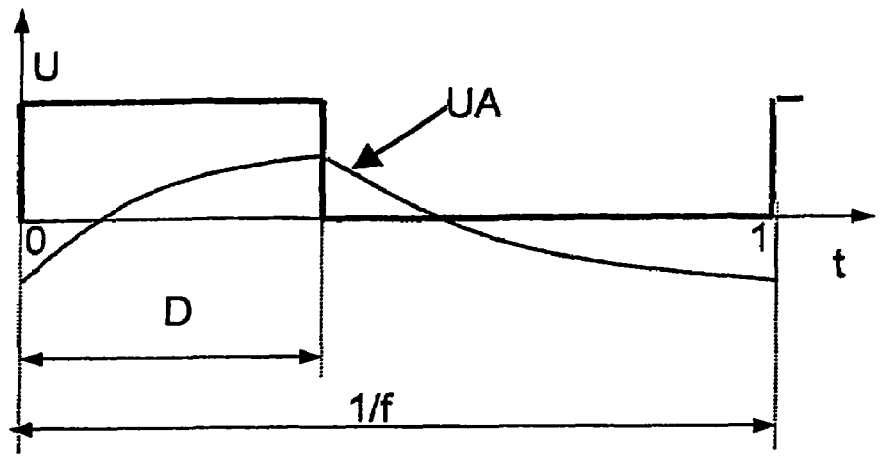
FIG. 4 is a schematic time profile of a period of an output voltage of the converter circuits according to FIG. 1

Parameters for adapting the electrical powers P1, P2 supplied to the induction coils I1, I2 are firstly the switching frequencies f1, f2 and secondly a relative switch-on time D. FIG. 4 shows a schematic time profile of a period of a first output voltage UA of the converter circuit according to FIGS. 1a and 1b. The period 1/f is normalised to unity in FIG. 4. The output voltage UA increases during the relative switch-on time D and then decreases slowly again. The electrical powers P1, P2 supplied to the induction coils I1, I2 are highest for relative switch-on times D of 0.5.

Figure 5:
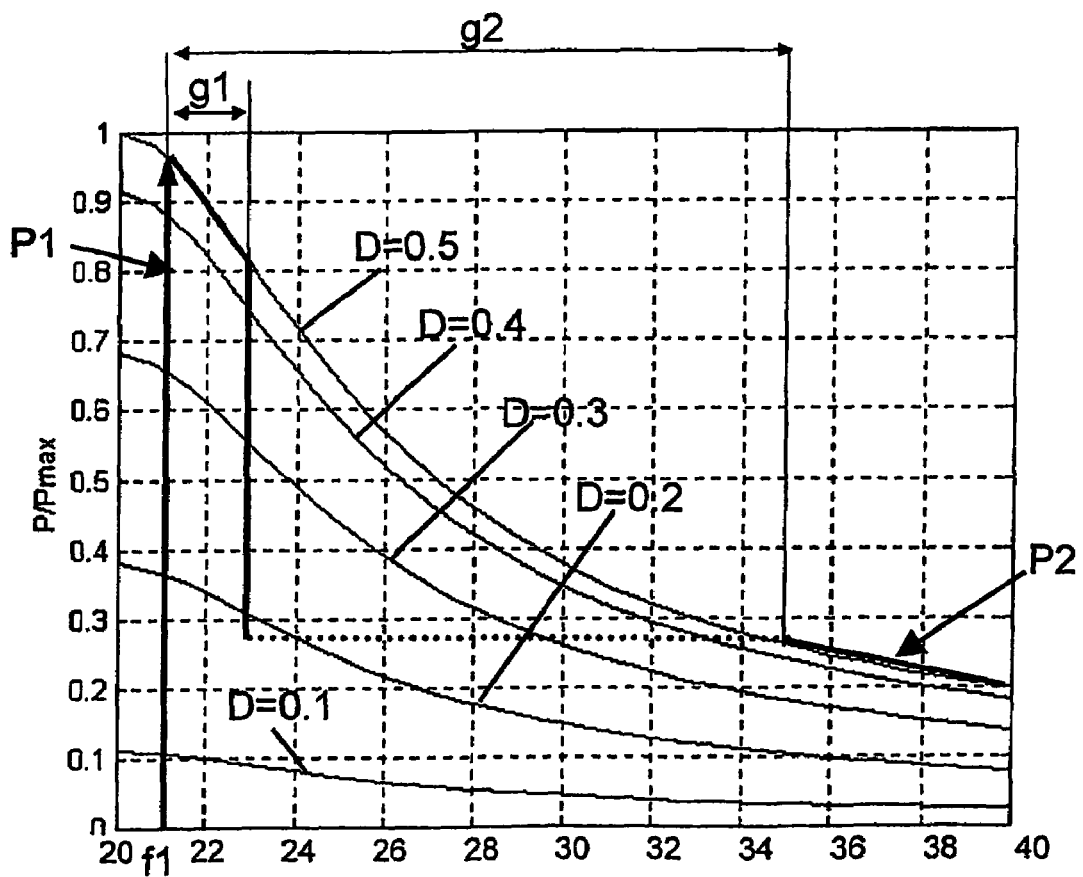
FIG. 5 is a schematic diagram of an adaptation of electrical output powers for the converter circuits according to FIG. 1 taking into account a first and a second cut-off frequency.

FIG. 5 shows a schematic diagram of an adaptation of the electrical output powers P1 and P2 for the two induction coils I1, I2 according to the converter circuits from FIGS. 1a and 1b taking into account the two cut-off frequencies g1 and g2. For the first induction coil I1, for example, which requires the higher electrical power P1 of the two induction coils I1, I2, the switching frequency f1 is specified as 21 kilohertz for example and the relative switch-on time D is specified as 0.5. The electrical power P2 for the second induction coil I2 is now adjusted by means of the relative switch-on time D and by means of the switching frequency f2 taking into account the two cut-off frequencies g1 and g2. The second switching frequency f2 can lie in a range between the first switching frequency f1 (here 21 kilohertz) and the sum of the first switching frequency f1 and the first cut-off frequency g1 (here 23 kilohertz) and above the sum of the first switching frequency f1 and the second cut-off frequency g2 (here 35 kilohertz). In this way it is ensured that the noise at the frequency fS which is produced from the difference between the second switching frequency f2 and the first switching frequency f1 is not perceived by the human hearing.

REFERENCE LIST

B frequency band
C1+ capacitor
C1 capacitor
C2+ capacitor
C2 capacitor
CF1 capacitive input filter
CF2 capacitive input filter
D relative switch-on time
f frequency
$f_{max}$ maximum frequency perceived by human hearing
f1 switching frequency of the first induction coil
f2 switching frequency of the second induction coil
fS frequency of the noise
g1 first cut-off frequency
g2 second cut-off frequency
H audibility threshold
I1 first induction coil
I2 second induction coil
L sound level
L1 sound level at the first switching frequency
L2 sound level at the second switching frequency
LS level of noise at fS
P electrical power
P1 electrical power of the first induction coil
P2 electrical power of the second induction coil
R1 changeover switch
R2 changeover switch
t time
U voltage
UA output voltage
V voltage source

We claim:

1. A method of operating a frequency converter circuit having at least two outputs respectively connected to a load, the method which comprises:

operating a first output at a first switching frequency and simultaneously operating a second output at a second switching frequency different from the first switching frequency to produce noise having a frequency generated by a superposition of the first switching frequency and the second switching frequency;

operating the converter circuit to set the first switching frequency and the second switching frequency such that the frequency of the noise is lower than a first cut-off frequency or higher than a second cut-off frequency, the second cut-off frequency being higher than the first cut-off frequency; and regulating an electrical power of at least one of the first and second outputs by adjusting the switching frequency and the relative switch-on time.

2. The method according to claim 1, wherein the load is an induction coil.

3. The method according to claim 1, which comprises determining the first cut-off frequency and/or the second cut-off frequency in dependence on a level of the noise.

4. The method of claim 3, further comprising the step of estimating a level of the noise using the first and second switching frequencies of the first and second outputs and the electrical power supplied to the loads.

5. The method according to claim 1, which comprises determining the first cut-off frequency and/or the second cut-off frequency in dependence on a total electrical power of the outputs.

6. The method according to claim 1, which comprises setting the first cut-off frequency at 2 kilohertz and/or setting the second cut-off frequency at 14 kilohertz.

7. The method of claim 1, wherein:

the first switching frequency is determined according to the required electrical power;

the relative switch-on time of 0.5 is used for the first output; and the electrical power of the second load is adjusted using the relative switch-on time and the second switching frequency, and taking into account the first and second cut-off frequencies.

8. The method of claim 1, wherein the frequency of the noise corresponds to a difference between the second switching frequency and the first switching frequency.

* * * * *